United States Patent
Yamade et al.

(10) Patent No.: US 6,823,046 B2
(45) Date of Patent: Nov. 23, 2004

(54) TELEPHONE ANSWERING DEVICE, AND METHOD FOR TELEPHONE ANSWERING BY ACQUIRING PROCEDURE FILES STATING VARIOUS ANSWERING FUNCTIONS REALIZED BY TELEPHONE ANSWERING DEVICE THEREOF

(75) Inventors: Shin Yamade, Tokyo (JP); Masahiro Michiwaki, Tokyo (JP)

(73) Assignees: GF Co., Ltd., Tokyo (JP); Dokonjosoft Co., Ltd., Tokyo (JP)

( * ) Notice: Subject to any disclaimer, the term of this patent is extended or adjusted under 35 U.S.C. 154(b) by 41 days.

(21) Appl. No.: 09/973,863

(22) Filed: Oct. 10, 2001

(65) Prior Publication Data

US 2002/0051520 A1 May 2, 2002

(30) Foreign Application Priority Data

Oct. 23, 2000 (JP) ........................................ 2000-322403

(51) Int. Cl.⁷ ................................................ H04M 1/64
(52) U.S. Cl. ............................... 379/88.17; 379/88.13; 379/88.18; 379/88.04; 379/93.24
(58) Field of Search ...................... 379/67.1, 70, 88.04, 379/88.17, 88.18, 88.13, 93.24

(56) References Cited

U.S. PATENT DOCUMENTS

| | | | |
|---|---|---|---|
| 6,094,679 A | 7/2000 | Teng et al. | |
| 6,141,413 A * | 10/2000 | Waldner et al. | 379/88.17 |
| 6,408,062 B1 * | 6/2002 | Cave | 379/210.01 |

FOREIGN PATENT DOCUMENTS

| | | |
|---|---|---|
| JP | 3-157737 | 7/1991 |
| JP | 7-162522 | 6/1995 |
| JP | 10-107908 | 4/1998 |
| JP | 10-307746 | 11/1998 |
| JP | 10-336346 | 12/1998 |
| JP | 11-232355 | 8/1999 |
| JP | 2000-20357 | 1/2000 |
| JP | 2000-137596 | 5/2000 |
| JP | 2000-172699 | 6/2000 |
| JP | 2000-270105 | 9/2000 |
| WO | WO 00/54251 | 9/2000 |

* cited by examiner

*Primary Examiner*—Fan Tsang
*Assistant Examiner*—Ming Chow
(74) *Attorney, Agent, or Firm*—Harness, Dickey & Pierce, P.L.C.

(57) ABSTRACT

There are obtained various telephone answering procedures by stating telephone answering procedures by a markup language, and by acquiring the telephone answering procedures via a communication network. A telephone answering device which executes an answering process in respect to a telephone connected via a telephone communication network, and comprises a communication portion for connecting with an appropriate WWW server through the communication network under the command of a central controlling portion, a recording portion for acquiring and recording an HTML document described with the telephone answering procedures in the markup language from the WWW server connected in the communication portion, a decoding portion for reading out the telephone answering procedures HTML document from the recording portion, and decoding a series of execution commands of the telephone answering procedures, and a telephone controlling portion for executing the answering operation to the telephone according to the execution command of the decoded telephone answering procedures when a call is received from the portable telephone.

5 Claims, 3 Drawing Sheets

| TIME AND DATE OF CALL RECEIVED | TELEPHONE NUMBER OF OTHER PARTY | ANSWER TO FIRST QUESTION | ANSWER TO SECOND QUESTION | ANSWER TO THIRD QUESTION | SPEECH FILE |
|---|---|---|---|---|---|
| 00/09/20/13:00 | 09000524354 | 1 | 2 | 1 | 0000001.wav |
| 00/09/21/14:00 | 0900025478 | 1 | 3 | 1 | 0000002.wav |
| 00/09/21/15:30 | 0900245781 | 2 | 1 | 2 | 0000003.wav |
| 00/09/22/09:00 | 0903547851 | 1 | 1 | 1 | 0000004.wav |
| 00/09/22/10:00 | 0502468751 | 2 | 2 | 1 | 0000005.wav |

FIG. 3

TELEPHONE ANSWERING DEVICE, AND METHOD FOR TELEPHONE ANSWERING BY ACQUIRING PROCEDURE FILES STATING VARIOUS ANSWERING FUNCTIONS REALIZED BY TELEPHONE ANSWERING DEVICE THEREOF

BACKGROUND OF THE INVENTION

The present application claims priority upon Japanese Patent Application No. 2000-322403 filed on Oct. 23, 2000, which is herein incorporated by reference.

1. Field of the Invention

The present invention relates to a telephone answering device, and also to a method for telephone answering by acquiring procedure files stating various answering functions to be realized by the telephone answering device.

2. Description of the Related Art

There are various methods of providing the procedures for telephone answering to the telephone answering device. For example, there is a method of providing by adding a new program for the telephone answering device, a method of providing using a software to provide telephone answering procedures attached to the telephone device, and a method of providing by stating the telephone answering procedures in the data base which may be read by the telephone device. With any of these methods, the telephone answering procedures may be provided through a communication line, to the telephone answering device. But since in any of the cases, there is a need to provide telephone answering procedures to match the telephone answering device which is the object, an instructor who tries to provide the telephone answering procedures had to learn the specifications of the telephone answering procedures which each telephone answering device requires, and then make a program or data base stating the telephone answering procedures. Further, since these telephone answering procedures have nothing in common with the HTML (HyperText Markup Language) used generally by such as an Internet, there is no connection between telephone control and Internet communication. Thus, aside from sending in a format such as an attached file a program with the telephone answering procedures itself made independent, and operating a software with remote manipulation by communication for telephone answering procedure operations attached to the telephone answering device, there was no method to provide the telephone answering procedures to the telephone answering device.

Recently, a portable telephone having a communicating function to such as the Internet, and having a browsing function of such as a homepage stated by a markup language (network corresponding language) such as HTML is becoming popular. By performing a simple description to the markup language for browsing of these portable telephones, calling from the telephone may be easily performed which is for calling simply as a conventional portable telephone. Thus, in order to perform telephone answering or the like, a telephone answering device for every line needs to be prepared, investment in equipment thereof becomes excessive, and obstructs the promotion of use of the telephone answering device.

SUMMARY OF THE INVENTION

The present invention is made in view of the above conventional problems, and the object thereof is to provide a telephone answering device, and a telephone answering method thereof, which can realize desired diverse telephone answering functions, by stating the telephone answering operations with a markup language which is highly generalized and used widely in such as Internet communication, and acquiring the telephone answering operations via a communication network and obtaining the various telephone answering procedures.

The telephone answering device according to the present invention performs an answering process to a telephone connected via a telephone communication network, and is provided with the following (A) to (F) means.

(A) communication means for connecting with an appropriate WWW server through the communication network;

(B) dialers'-list acquiring-storage means for acquiring and storing a dialers' list including one or a plurality of dialed numbers from said WWW server connected by said communication means;

(C) file-acquiring-storage means for acquiring, by said communication means, and storing a telephone-answering-procedure file based on a URL which is corresponded to said dialed number, wherein a location of the file, which is stated with a telephone-answering procedures in markup language, is corresponded to said dialed number in said dialers' list as the URL;

(D) markup-language-file-decoding means for reading out said telephone-answering-procedure file from said storage means, and decoding a series of execution commands of said telephone-answering procedures;

(E) calling means for reading out said dialers' list from said dialers' list acquiring storage means and calling based on said dialed number; and (F) answering-operation-execution means for executing an answering operation to the telephone, in accordance with the execution command of the decoded telephone-answering-procedures, when a relevant dialer is connected to via the telephone communication network by said calling means.

Further, the telephone answering method according to the present invention, acquires each procedure file stating the various answering functions realized in the telephone answering device for executing the answering processes to the telephone connected via the telephone communication network, wherein comprising the following means (I) to (VI).

a step of connecting with an appropriate WWW server through the communication network;

(II) a dialers' list acquiring storage step for acquiring and storing the dialers' list including one or a plurality of the dialed numbers from said WWW server connected to by said communication means;

(III) a file acquiring storage step for acquiring, by said communication means, and storing said telephone answering procedure file based on a URL corresponding to said dialed number, wherein a location of the file, which is stated with the telephone answering procedures in markup language, is corresponded to said dialed number in said dialers' list as the URL;

(IV) a markup language file decoding step for decoding a series of execution commands of said telephone answering procedures by reading out said telephone answering procedure file;

(V) a calling step for reading out said dialers' list and conducting calling based on said dialed number; and (VI) an answering-operation execution step for executing an answering operation to a relevant telephone, in accordance with said execution command of said decoded telephone answering procedures, when connected to the relevant dialer via said telephone communication network.

BRIEF DESCRIPTION OF THE DRAWINGS

For a more complete understanding of the present invention and the advantages thereof, reference is now made to the following description taken in conjunction with the accompanying drawings wherein:

FIG. 3 is a table showing an output example from a recording portion of the telephone answering device according to one embodiment of the present invention.

DETAILED DESCRIPTION OF PREFERRED EMBODIMENTS

Figure 1:
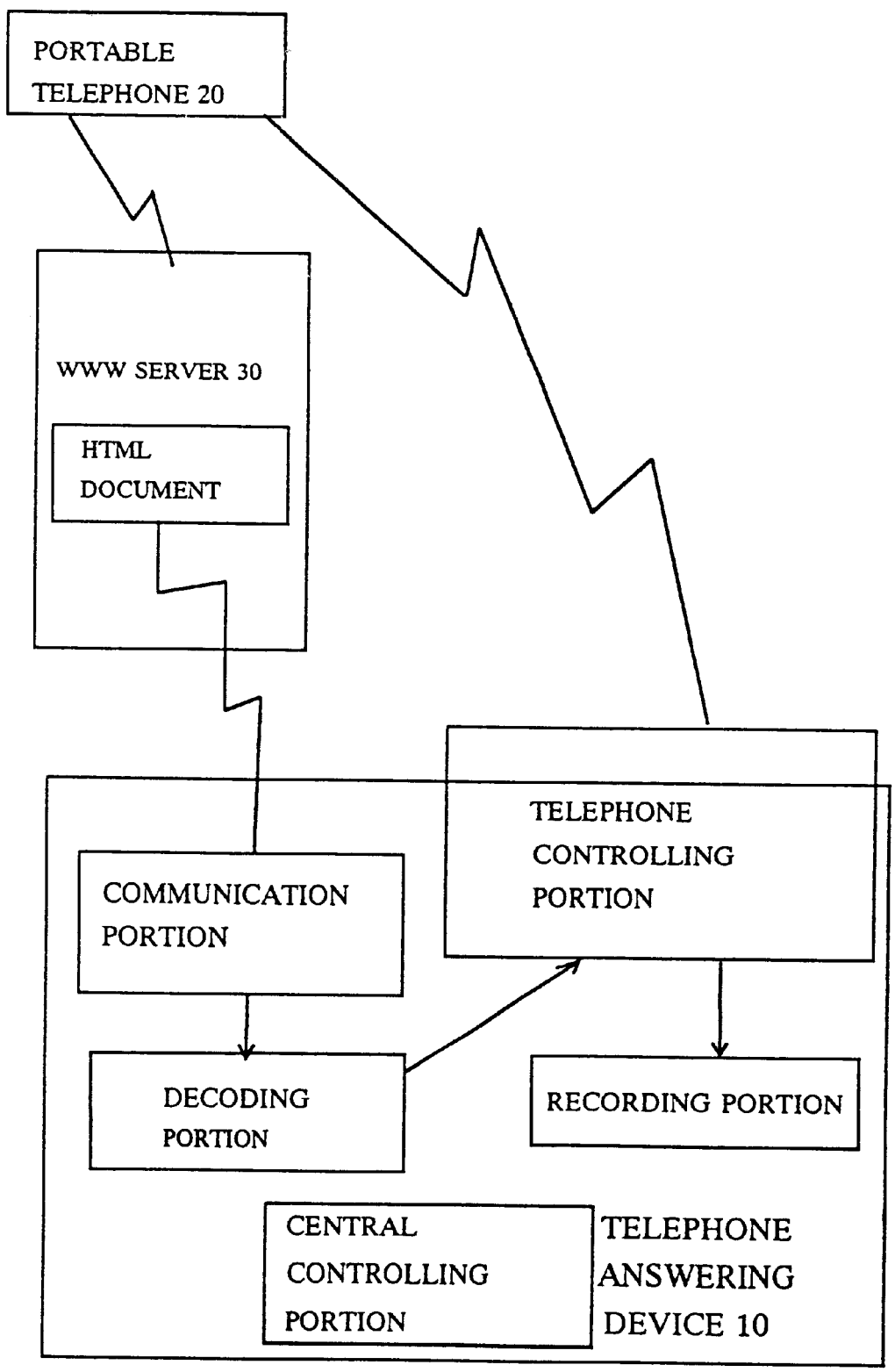
FIG. 1 is a block chart showing a summary of a telephone answering device and a telephone answering method according to an embodiment of the present invention.
Figure 2:
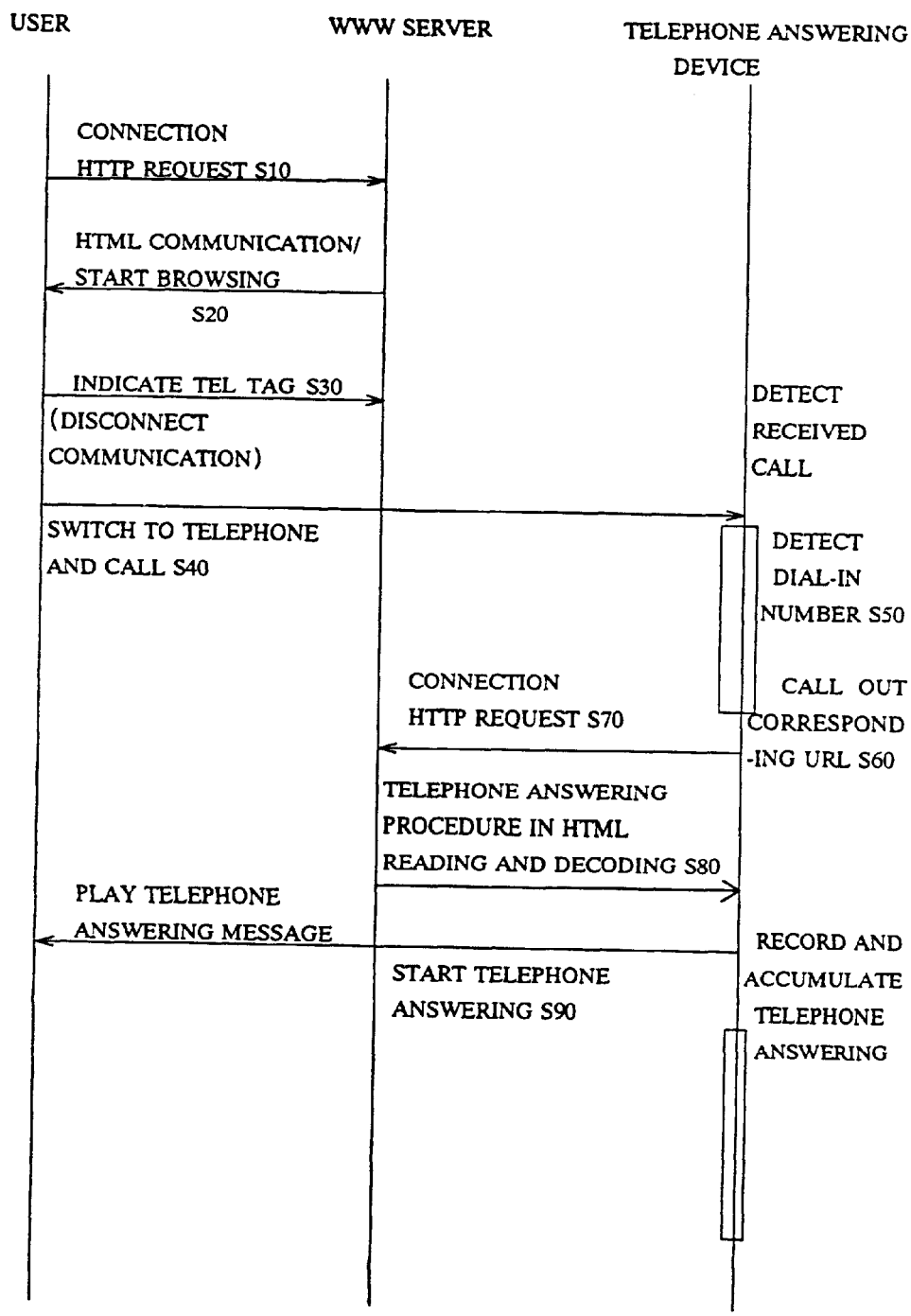
FIG. 2 is a diagram showing an operation procedures chart of the telephone answering device and the telephone answering method according to one embodiment of the present invention.

One embodiment of the present invention is described referring to FIGS. 1 to 3.

Basic Structure and Operation Outline of a Telephone Answering Device

According to one example of a telephone answering device and a telephone answering method, the summary of the entire system thereof is shown as a block diagram of FIG. 1. This block diagram is only one example, and may appropriately be altered according to necessity.

As shown in FIG. 1, a telephone answering device 10 is connected to a portable telephone 20 through a telephone line network, as well as being connected to a WWW (World Wide Web) server 30 through a communication network such as the Internet.

The WWW server 30 stores various program files stated in HTML (HTML document) as resources.

The portable telephone 20 has an Internet connection which is namely referred to as i-mode and an HTML document browsing function, and with the portable telephone functions may connect to such as the Internet to access the WWW sites as a communication terminal, and may appropriately browse homepages. Note that, in the present invention, instead of the portable telephone 20, such as PDA (personal digital assistant) having a function for Internet connection, a function for homepage browsing and a telephone function, and a telephone for indoors having functions of Internet connection and homepage browsing by combining with a computer, may be used.

The telephone device 10 is constituted by a central controlling portion, a communication portion which operates appropriately according to a command of the central controlling portion, a telephone controlling portion, a decoding portion, a recording portion and the like. This telephone device 10 is provided with a dial circuit for simultaneously conducting telephone answering with multiple portable telephones 20, and accommodates multiple telephone lines, and particularly has multiple Dial-in numbers (received numbers) for the first embodiment, as is described later on.

The central controlling portion is structured by CPU, and is connected to such as RAM and ROM not shown, and appropriately unifies the operations of the whole and of each portion. The communication portion is appropriately structured by the CPU and RAM or ROM and the like, and has an interface typified by a CGI (Common Gateway Interface) and connectable to a communication network such as the Internet, and executes a communication operation by an HTTP (HyperText Transfer Protocol) request from the WWW server. The decoding portion is appropriately structured of CPU and RAM or ROM and the like, and decodes the HTML document handed from the communication portion and passes the execution command of the telephone control to the telephone controlling portion. That is, in the present invention, a markup language for describing a command to display such as a homepage by a browser is used for describing the command of the telephone answering procedures.

The telephone controlling portion is appropriately structured by the CPU and RAM or ROM and the like, has a dial circuit and appropriately connects the telephone line with the telephone line network. Further, this telephone controlling portion executes the telephone control command decoded by the decoding portion and controls the telephone line, and has a speech-synthesis circuit (not shown) to change a text sentence to a speech signal, in order to send the speech signal to the telephone line which is connected when answering the telephone. The recording portion is structured by a hard disk device or the like, and records the telephone answering details as state transitions through the telephone controlling portion. This recorded content may be output to the outside through the communication portion and the telephone controlling portion.

Operation of the Telephone Answering Device

First, referring to FIG. 2, the operation of the telephone answering device of a first embodiment according to the present invention is described. First, a user accesses the predetermined WWW server (site) through the Internet using the portable telephone with a telephone function, and for example acquires a document in the HTML form and starts browsing, thus the relevant homepage may be browsed (S10 to S20). In this HTML document a phone number (dialed number) for calling the telephone answering device is stated in a form such as <A href="tel:XXX . . . > within an anchor tag <>. With the portable telephone, when the incorporated browser detects a command "tel:" within the anchor tag <>, a script (program) for automatic dialing is started. That is, the portable telephone, automatically, or according to the operation inputted by the user, the telephone number shown as "XXX . . . " is immediately called. At this time, usually, at the same time as the call, the communication with the WWW server is disconnected (S30 to S40).

Next, when a call from the portable telephone is received by the telephone answering device, the Dial-in number, namely the received number of the telephone answering device is detected (S50). That is, the detected Dial-in number is "tel:XXX . . . ", and the number stated in the HTML is found.

Then, referring to a table of Dial-in received numbers (not shown in the figure) stored in an appropriate storing device (for example, a hard disk device) of the telephone answering device, a URL (uniform resource locator) corresponding to the Dial-in number is found, and a network communication portion is notified (S60). In the Dial-in received number table, for example, "http://www.GFnet.ne.jp/" as the URL is corresponded to a Dial-in number "03-5978-XXXX".

The network communication portion connects to the network and acquires the HTML document stored in the WWW server specified by a notified URL (S70 to S80). Note that, when acquiring the HTML document stated with the telephone answering procedures, not just the Dial-in number, but also an ID specifying the caller (dialing number, terminal ID) may be a key for specifying the relevant URL.

Further, the HTML document stated with various telephone answering procedures, are respectively contained in the predetermined server by each maker of the relevant files.

The acquired HTML document is stated with the inherent telephone number procedures in a form based on a predetermined rule. The acquired HTML document is handed to the decoding portion. The decoding portion decodes the HTML, and converts it to a series of commands for telephone control, and hands it to the telephone controlling portion. The telephone controlling portion, in accordance with the received command, performs the communication control with the portable telephone which is connected to a telephone line (during a call) (S90). Specifically, the predetermined speech signal is played and by first sending the speech signal to the telephone line, the call with the user of the portable telephone is performed. The play process of this speech signal is performed by playing with the speech synthesis circuit of the telephone controlling portion the text sentence decoded from the HTML document in the decoding portion.

For example, various telephone answering operations are performed such as, playing and sending messages such as "please press your age with the dial buttons" or "please record your name after the tone", receiving and recording push tone signals sent in correspondence with a questionnaire or the like, and making recorded files of the user's speech.

At this time, the recording portion records all of the series of movements of the telephone controlling portion, and records and accumulates "what number the received Dial-in number was", "what kind of message was played", "what push tone numbers the other party on the telephone pressed" and "what name the recorded file was left as", and enables the record of the questionnaire survey result to be browsed for every telephone call, for the contents maker of the telephone answering procedures. As a mechanism of a browsing output, with a remote operation by the telephone line from the contents maker side, the questionnaire answering data (including speech files) may be outputted. Or, the recorded content may be accumulated in the predetermined WWW server, and may be referred to by the accessing of the contents maker side. As an example of a questionnaire answering data, as shown in FIG. 3, there are the received time from the portable telephone, the telephone number of the other party (dialed number), which push tone was pressed to select a number for each of the first to third questions as a questionnaire reply, and a file recording the voice message of the user in respect to the questions.

Decoding the HTML documents stating the telephone answering procedures as described above and the operations of telephone answering, are described in detail with specific examples. The descriptive example of the HTML document determined in the telephone answering example of a florist as a shop guide is simply shown (the portion in ''). Descriptive example of HTML document: '<HTML> <HEAD> <TITLE>0359782261</TITLE> </HEAD> <BODY> <A HREF="greetings.WAV"> Thank you for calling. This is 'Nakayoshi Florist'. If you want to know the place of the shop, press dial button 1, if you want to know the flower of the season press dial button 2. </A> <BLOCKQUOTE>

1st button <A HREF="place.wav" accesskey="1"> place is Bunkyo-ku, Tokyo, in front of Ochanomizu Women's University main gate. </A> 2nd button <A HREF="flower of the season.wav" accesskey="2">

At present cosmoses are recommended. Chinese bellflowers are also pretty. </A> </BLOCKQUOTE> <A HREF= "goodbye.WAV"> We look forward to seeing you at the shop. Thank you for your telephone call. </A> </HTML>'

In this descriptive example, when a call is received, the Dial-in number to be detected is determined in advance. That is, to the telephone receiving Dial-in to '0359782261', the described script is decoded and executed. Note that, when the user telephones this Dial-in number, a display of "to automatic answering telephone" is shown on the user's portable telephone, and determining a command to receive the operation input selecting the display portion at the WWW contents side which is first accessed by the user. Then, when a telephone call from the user is received by the telephone answering device, a speech file of 'greetings.wav' is played. Note that, as well known, basically the command sentences are executed in the stated order from the top, but portions stated with a special tag are executed by the user's selection, so that not everything is executed in order regarding this portion.

In this description example, when a DTMF signal is received showing that the second dial button has been pressed from the user's telephone, it is described so that a speech file of 'flower of the season.WAV' is played and a speech signal is sent to the telephone which is connected. Then, finally 'goodbye.WAV' is played and it ends. In this description example, since each WAV file is referred to and a script reading it is defined, there is an advantage that the speech answering content itself and the telephone answering procedures itself may be simultaneously described without interfering with each other. However, it is not necessary to be stated in this way and may be appropriately altered.

Next, a second embodiment is explained. In the above first embodiment, after receiving a call from the user's telephone, acquiring an HTML document as well as executing the telephone answering process is performed for the relevant telephone. In respect to the above, in this second embodiment, telephone answering is performed, by calling the user's telephone based on the dialers' list acquired in advance, without waiting to receive a call. Aside from this differing matter, it is the same as the above described first embodiment, thus only the differing matter is explained.

First, the communication portion of the telephone answering device, is connected to a network, acquires a dialers' list including the plurality of dialed numbers contained in the predetermined WWW server, and stores it in the hard disk device. Then, at an appropriate time the communication portion reads out the dialers' list, and appropriately selects the dialed number. This called number is corresponded to a URL showing the place of the HTML document describing the telephone answering procedures. This URL may be corresponded in a dialers' list, or the URL table in respect to the dialed number or the dialers' list may be prepared separately at a telephone answering device. Next, the communication portion, is connected to the network, and an HTML document contained in a WWW server specified by this URL is acquired. The acquired HTML document is handed to the decoding portion, the decoding portion converts the HTML document to a series of commands for telephone control, and hands it to the telephone controlling portion. The telephone controlling portion follows the received command, and performs communication control with the portable telephone which is connected to a telephone line (during a call). In this embodiment, the telephone does not need functions for Internet connection and homepage browsing.

Note that, as a description language for the documents defining the various telephone answering procedures according to the present invention, HTML or other mark-up languages similar to this (C-HTML, HDML, MML, and the like) which are highly generalized and are usable on the network, may be used.

As conventionally, there is no need to remember the language specification unique to the telephone answering device or the operation of the software, and by stating the telephone answering operations by a markup language which is highly generalized and generally used for such as Internet communication, and by the telephone answering device acquiring the telephone answering operations via the communication network, desired various telephone answering procedures may be obtained, and various abundant telephone answering functions may be realized with one telephone answering device.

Further, since the answering procedures may be stated in a markup language which is highly generalized and widely used for file transfer on the communication network, the following advantages (i), (ii) and (iii) for the content maker making the contents of the telephone answering control procedures may be obtained.

(i) A file describing in HTML the separate diverse answering procedures which each content maker wants to realize is contained in the server via a communication network. By a telephone answering device taking in the appropriate relevant file and operating according to the described procedures, the desired telephone answering function which each content maker desires may be realized.

(ii) Since multiple content makers may share one telephone answering device, each content maker does not have to have his/her own telephone answering device, therefore the burden for the investment in equipment, running cost and the like may be solved or greatly decreased. Further, troublesome time to learn the telephone answering control procedures unique to each device may be omitted.

(iii) When a file with the answering procedures described in HTML are separately made corresponding to a received number or a dialed number, separate telephone answering devices corresponding to the received number or the dialed number may be realized with one answering device.

Further, the mark language itself is a language which is relatively easy to master, and a telephone answering device with the telephone answering procedures described in this language is by far easier to handle compared with a conventional device, and may readily provide a telephone answering service.

For the user of such as the portable telephone with the communication function, the inconvenience of such as information registering and questionnaire answering by sending characters using the telephone buttons as a keyboard is solved, and information registering and questionnaire answering may be easily performed, with a telephone that he/she is familiar with.

Further, from the WWW server, the dialers' list including the dialed number may be acquired and stored. Therefore, the dialers' list may be received from the external WWW server. Thus, when receiving a new dialers' list, troublesome input operation does not have to be performed, and only the designation of the URL specifying the place of the dialers' list needs to be altered. Therefore, the telephone answering device which may conduct the renewal of the dialers' list extremely easily may be realized.

Further, the place of the file stated with the telephone answering procedures in markup language is corresponded to the dialed number in the dialers' list as the URL, and the telephone answering procedure file is acquired and stored based on the URL corresponding to the dialed number. Thus, the file stated with the telephone answering procedures may be received from the external WWW server based on the URL. Thereby, when receiving a new telephone answering procedure file, troublesome input operation does not have to be performed, and only the designation of the URL has be altered. Therefore, the telephone answering device which may perform updating of the telephone answering procedures extremely easily may be realized.

Although the preferred embodiment of the present invention has been described in detail, it should be understood that various changes, substitutions and alternations can be made therein without departing from spirit and scope of the inventions as defined by the appended claims.

What is claimed is:

1. A telephone answering device which performs answering processes to a telephone connected to via a telephone communication network, comprising the following means of (A) to (F):

(A) communication means for connecting with an appropriate WWW server through the communication network;

(B) dialers'-list acquiring-storage means for acquiring and storing a dialers' list including one or more plurality of dialed numbers from said WWW server connected by said communication means;

(C) file-acquiring-storage means for acquiring, by said communication means, and storing a telephone-answering-procedure file based on a URL which corresponds to said dialed number, where the telephone-answering-procedure file includes a series of execution commands and a reference to at least one speech file having speech answering contents, said telephone-answering-procedure being formulated in tags of a markup language;

(D) markup-language-file-decoding means for reading out said telephone-answering-procedure file from said storage means, and decoding the series of execution command of said telephone-answering procedures;

(E) calling means for reading out said dialers' list from said dialers' list acquiring storage means and calling based on said dialed number; and (F) answering-operation-execution means for executing an answering operation to the telephone, in accordance with the execution command of the decoded telephone-answering-procedures, when a relevant dialer is connected to via the telephone communication network by said calling means.

2. A telephone answering device according to claim 1, further comprising means for recording a content of said answering operation with said telephone conducted by said answering-operation-execution means.

3. A telephone answering method which acquires each procedure file stating the various answering functions realized by the telephone answering device for executing the answering processes to the telephone connected to via the telephone communication network, comprising the following means (I) to (VI):

(I) a step of connecting with an appropriate WWW server through the communication network;

(II) a dialers' list acquiring storage step for acquiring and storing the dialers' list including one or plurality of the dialed numbers from said WWW server connected to by said communication means;

(III) a file acquiring storage step for acquiring, by said communication means, and storing said telephone answering procedure file based on a URL which corresponds to said dialed number, where the telephone-answering-procedure file includes a series of execution commands and a reference to at least one speech file having speech answering contents, said telephone-answering-procedure being formulated in tags of a markup language;

(IV) a markup language file decoding step for decoding the series of execution commands of said telephone answering procedures by reading out said telephone answering procedure file;

(V) a calling step for reading out said dialers' list and conducting calling based on said dialed number; and (VI) an answering-operation execution step for executing an answering operation to a relevant telephone, in accordance with said execution command of said decoded telephone answering procedures, when connected to the relevant dialer via said telephone communication network.

4. A telephone answering method according to claim 3, further comprising a step of recording the content of said answering operation with said telephone in said answering operation execution step.

5. A telephone answering method according to one of claim 3 or 4, further comprising a step of storing in said predetermined server by each file maker, said file stated with said various telephone answering procedures.

\* \* \* \* \*